United States Patent
Filart

(10) Patent No.: US 11,223,955 B2
(45) Date of Patent: *Jan. 11, 2022

(54) MITIGATION OF SPOOF COMMUNICATIONS WITHIN A TELECOMMUNICATIONS NETWORK

(71) Applicant: T-Mobile USA, Inc., Bellevue, WA (US)

(72) Inventor: Homer Nicolas B. Filart, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/875,483

(22) Filed: May 15, 2020

(65) Prior Publication Data

US 2020/0280857 A1    Sep. 3, 2020

Related U.S. Application Data

(63) Continuation of application No. 16/539,985, filed on Aug. 13, 2019, now Pat. No. 10,681,556.

(60) Provisional application No. 62/718,296, filed on Aug. 13, 2018.

(51) Int. Cl.
*H04M 1/66* (2006.01)
*H04W 12/122* (2021.01)
*H04L 29/06* (2006.01)

(52) U.S. Cl.
CPC ....... *H04W 12/122* (2021.01); *H04L 63/1466* (2013.01)

(58) Field of Classification Search
CPC . H04W 12/122; H04W 12/126; H04W 12/72; H04W 4/021; H04W 4/06; H04W 4/16; H04L 63/1466; H04L 65/1073; H04L 65/1046; H04L 65/105; H04L 65/1006; H04L 65/1016; H04L 63/0823; H04M 3/2281
USPC ......................................................... 455/411
See application file for complete search history.

(56) References Cited

U.S. PATENT DOCUMENTS

| | | | | |
|---|---|---|---|---|
| 7,813,822 | B1 * | 10/2010 | Hoffberg | H04N 21/44222 700/94 |
| 8,316,237 | B1 * | 11/2012 | Felsher | H04L 9/0825 713/171 |
| 9,338,597 | B2 * | 5/2016 | Abu-Hakima | H04W 4/90 |
| 9,736,300 | B2 * | 8/2017 | Cook | H04M 1/663 |
| 9,832,126 | B1 * | 11/2017 | Davis | H04M 3/367 |
| 10,623,581 | B2 * | 4/2020 | Rao | H04L 67/08 |

(Continued)

OTHER PUBLICATIONS

U.S. Appl. No. 16/539,985, Notice of Allowance, dated Jan. 29, 2020, 42 pages.

*Primary Examiner* — Mahendra R Patel
(74) *Attorney, Agent, or Firm* — Han Santos, PLLC

(57) ABSTRACT

The present disclosure describes techniques for detecting and mitigating a spoof communication within a network, such as a Session Internet Protocol (SIP) network. More specifically, a SIP server, may receive a call request to initiate a Voice over Internet Protocol (VoIP) communication between an originating device and a recipient device. In response, the SIP server may analyze registration data associated with a subscriber account of the originating device, and in doing so, infer whether the call request is a spoof communication.

20 Claims, 4 Drawing Sheets

(56) References Cited

U.S. PATENT DOCUMENTS

| | | | |
|---|---|---|---|
| 2002/0039907 A1* | 4/2002 | McKenna | H04W 40/02 455/517 |
| 2004/0177048 A1* | 9/2004 | Klug | H04L 51/00 705/401 |
| 2006/0111105 A1* | 5/2006 | Bajar | H04W 12/06 455/435.1 |
| 2007/0106740 A1* | 5/2007 | Yach | H04L 51/38 709/206 |
| 2007/0121596 A1* | 5/2007 | Kurapati | H04L 29/06027 370/356 |
| 2009/0082019 A1 | 3/2009 | Marsico | |
| 2009/0086672 A1 | 4/2009 | Gholmieh et al. | |
| 2009/0270067 A1 | 10/2009 | Johnson | |
| 2010/0144350 A1* | 6/2010 | Walter | H04W 48/18 455/435.2 |
| 2011/0164596 A1* | 7/2011 | Montemurro | H04W 76/11 370/338 |
| 2011/0295996 A1 | 12/2011 | Qiu et al. | |
| 2012/0131204 A1 | 5/2012 | Song | |
| 2012/0164979 A1 | 6/2012 | Bachmann et al. | |
| 2012/0224528 A1* | 9/2012 | Tapia | H04W 88/18 370/328 |
| 2012/0295617 A1 | 11/2012 | Anchan et al. | |
| 2012/0297473 A1* | 11/2012 | Case | H04L 63/061 726/10 |
| 2014/0274008 A1* | 9/2014 | Olodort | H04W 52/0261 455/417 |
| 2015/0058950 A1* | 2/2015 | Miu | G06Q 20/401 726/7 |
| 2015/0223065 A1* | 8/2015 | Sporton | H04W 12/06 455/411 |
| 2015/0295940 A1 | 10/2015 | Patel et al. | |
| 2016/0182542 A1* | 6/2016 | Staniford | H04L 63/1416 726/23 |
| 2016/0219046 A1 | 7/2016 | Ballard et al. | |
| 2017/0111497 A1* | 4/2017 | Starr | H04M 3/42059 |
| 2018/0288060 A1* | 10/2018 | Jackson | H04L 63/102 |
| 2018/0309783 A1 | 10/2018 | Nakajima et al. | |
| 2019/0320004 A1 | 10/2019 | Allen et al. | |

* cited by examiner

MITIGATION OF SPOOF COMMUNICATIONS WITHIN A TELECOMMUNICATIONS NETWORK

RELATED APPLICATION

This application claims priority to a commonly owned U.S. Provisional Patent Application No. 62/718,296, filed on Aug. 13, 2018, and titled "Mitigation of Spoof Communications for Telecommunication Network Subscribers," and a commonly owned U.S. patent application Ser. No. 16/539,985, filed on Aug. 13, 2019, and titled "Mitigation of Spoof Communications within a Telecommunications Network, which are herein incorporated by reference in their entirety.

BACKGROUND

Today, the use of mobile devices is widespread. Continual advancements in mobile device technology can improve the productivity and quality of life for users by enhancing accessibility to real-time communications in a variety of environmental settings, such as a home, workplace, school, and/or so forth. However, mobile devices are highly susceptible to nuisance concerns by unspecified individuals that target some users for unwanted or ill-intentioned purposes. Unspecified individuals may include telephone marketers or spammers that initiate nuisance concerns. Unspecified individuals may also include individuals that impersonate a known person's identity (i.e. phone number) for fraudulent or nuisance purposes.

Therefore, the continual growth and advancement of mobile device technology can burden legitimate subscribers of a telecommunication service account in their attempt to trust that those voice communications received at their mobile device are from specified individuals with known identities, rather than unspecified individuals that spoof a known identity.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques to determine whether an incoming VoIP communication request is a spoof communication. In some cases, an ill-intentioned third-party may initiate a real-time communication session from a phone number that appears to be listed from a subscriber of a telecommunication network, despite the real-time communication having been initiated from a different telephone number. This practice, also known as caller ID spoofing, may provide a client with a misplaced assurance of an identity of the third-party and/or origin of the real-time communication session.

More specifically, a server is described that includes a spoof mitigation module that is configured to detect receipt of a call request message and further determine whether the PLMN identified within the most recent instance of registration data of an originating device corresponds with the origin network from which the call request message was sent. A match would indicate that the identity of the originating device is likely reliable. In contrast, a mismatch may indicate that the identity of the originating device may be spoofed and is likely unreliable.

In the illustrated embodiment, the spoof mitigation module is included within a SIP server and the call request message corresponds to a SIP INVITE message. However, the spoof mitigation module may be included within a different server using a different protocol, such as HTTP/HTTPS, LDAP, SS7, etc.

In some examples, the spoof mitigation module may infer a likelihood that a call request is being spoofed based on temporal indicators of the SIP INVITE message and a most recent instance of registration data. For example, a comparison of a point-in-time that the most recent instance of network registration occurred with a current point-in-time associated with receipt of the SIP INVITE message (i.e. call request) may be used to determine a likelihood that a call request corresponds to a spoof communication.

In various examples, the term "origin network" is intended to identify the network from which a call request was sent. In some examples throughout this disclosure, the term "origin network" further identifies an intermediate network from which a call request traverses to the HPLMN. For example, a first network may initiate a call request, and the call request may then traverse through an intermediate network before being delivered to the HPLMN. In this example, the intermediate network, as identified as origin network since it delivers the cal request to the HPLMN.

The term "techniques," as used herein, may refer to system(s), method(s), computer-readable instruction(s), module(s), algorithms, hardware logic, and/or operation(s) as permitted by the context described above and through the document.

Figure 1:
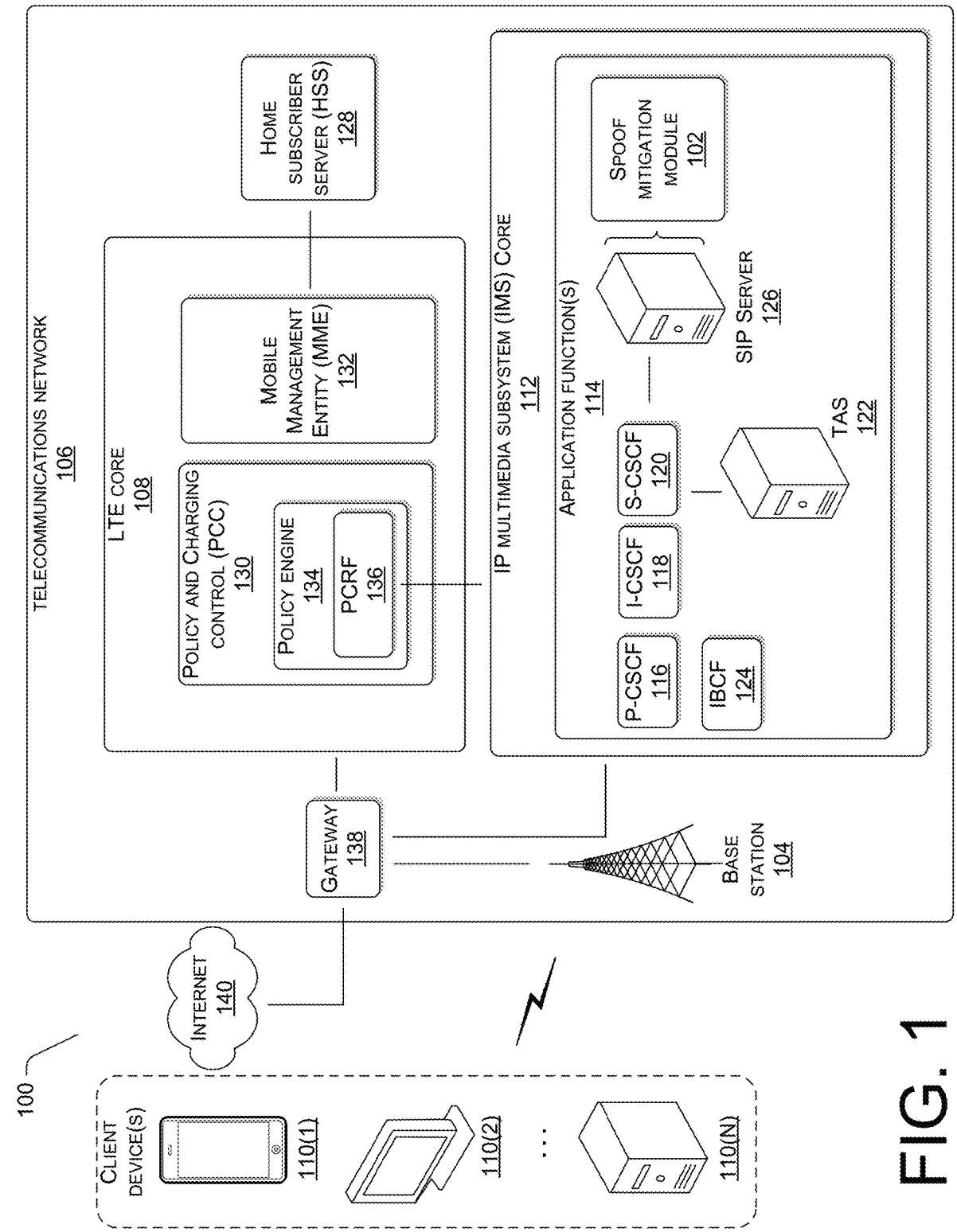
FIG. 1 illustrates a schematic view of a computing environment for operations of a spoof mitigation module on a Session Internet Protocol (SIP) server.

FIG. 1 illustrates a schematic view of a computing environment for operations of a spoof mitigation module 102 on a Session Internet Protocol (SIP) server. In FIG. 1A, the telecommunication network corresponds to a SIP network, such as a Long-Term Evolution (LTE) network. The computing environment 100 may include base station node(s) 104 and an LTE core 108. The base station node(s) 104 are responsible for handling voice and data traffic via air interfaces between the LTE core 108 and client devices, such as client device(s) 110(1)-110(N). The LTE core 108 may provide telecommunication and data communication services to multiple client devices, such as an LTE-compatible client device, collectively referred to as client device(s) 110(1)-110(N).

The client device(s) 110(1)-110(N) may include any sort of electronic device, such as a cellular phone, a smartphone, a tablet computer, an electronic reader, a media player, a gaming device, a personal computer (PC), a laptop computer, etc. The client device(s) 110(1)-110(N) may include a subscriber identity module (SIM), such as an eSIM, to identify the client device(s) 110(1)-110(N) to a telecommunication service provider network (also referred to herein, as "telecommunication network").

In various examples, an IP Multimedia Subsystem (IMS) core 112 may reside within the telecommunications network 106. The IMS core 112 may include application function(s) (AF) 114, such as a Proxy Call Session Control Function (P-CSCF) 116, an Interrogating Call Session Control Function (I-CSCF) 118, and a Serving Call Session Control Function (S-CSCF) 120, a Telephony Application Server (TAS) 122, an Interconnection Border Control Function (IBCF) 124, and a SIP server 126. The P-CSCF 116 behaves like a proxy by accepting requests and serving them internally or forwarding them towards to the I-CSCF 118 and S-CSCF 120. The S-CSCF 120 acts as a Session Initiation Protocol (SIP) registrar and in some cases as a SIP redirect server. The S-CSCF 120 is responsible for processing the location registration of a client device, client authentication, and call routing and processing. The I-CSCF 118 is tasked with selecting an S-CSCF 120 for serving an initial SIP request, particularly when a client device initiating the request does not know which S-CSCF 120 should receive the request. The TAS 122 may be configured to emulate calling features traditionally provided by a Public Switched Telephone Network (PSTN) or a legacy PLMN (i.e. 2G or 3G), such as call forwarding, voicemail, conference bridges, and/or so forth. The TAS 122 may further facilitate establishing a VoIP communication between client device(s) 110(1)-110(N).

The IBCF 124 is a network element deployed to protect the telecommunications network 106. The IBCF 124 may provide the telecommunications network 106 with measurements, access control, and data conversion facilities of communications received that the network edge.

In some examples, the SIP server 126 may correspond to one of the I-CSCF 118 or the S-CSCF 120. In other examples, the SIP server 126 may be separate and communicatively coupled to the I-CSCF 118 or S-CSCF 120.

In the illustrated example, the SIP server 126 may include a spoof mitigation module 102. The spoof mitigation module 102 may be configured to detect receipt of a SIP INVITE message at the SIP server 126 and may be further configured to determine whether the PLMN identified within the most recent instance of registration data of an originating device (i.e. client device (s) 110(1)-110(N)) corresponds with the origin network. The origin network may be identified within the SIP INVITE message or may correspond to the network from which the SIP INVITE message was sent. A match would indicate that the originating device is located within the same PLMN (i.e. HPLMN or VPLMN) from which the SIP INVITE message was sent, thus indicating that the identity of the originating device is likely reliable. In contrast, if the most recent instance of registration data indicates that the originating device is within a first PLMN (i.e. HPLMN or VPLMN), and the origin network identified within the SIP INVITE message indicates that the originating device is within a second PLMN that is different from the first PLMN (i.e. VPLMN or HPLMN), the mismatch may indicate that the identity of the originating device may be spoofed and is likely unreliable.

While this disclosure describes modifying a SIP server 126 to include a spoof mitigation module 102, further variations and modifications can be made such that the spoof mitigation module 102 is remotely executable on a separate server or a separate computing device, by the SIP server 126. One of ordinary skill in the art would appreciate that such an embodiment remains within the scope of the invention, as defined in the appended claims.

Additionally, the LTE core 108 may further include a Policy and Charging Control (PCC) 130 and a Mobile Management Entity (MME) 132. The PCC 130 may enable detection of communication service data flow and provide parameters for policy control and/or charging control. In the illustrated example, the PCC 130 may include a policy engine 134, such as a Policy and Charging Rules Function (PCRF) 136. The MME 132 performs signal functions in the LTE core 108. The MME 132 is further configured to send and receive signaling information needed to set up a bill, and address calls to the base station node(s) 104 and contains security protocols for authentication and authorization. The MME 132 may access the HSS 128 to retrieve the most recent registration data associated with one or more client device(s) 110(1)-110(N).

Further, a gateway 138 may interface with the IMS core 112 and the LTE core 108. The gateway 138 may include one or more servers and related components that are tasked with providing connectivity between the IMS core 112, the LTE core 108, the client device(s) 110(1)-110(N), and the internet 140. More specifically, the gateway 138 may act as a point of entry and exit for network traffic into the telecommunications network 106.

Figure 2:
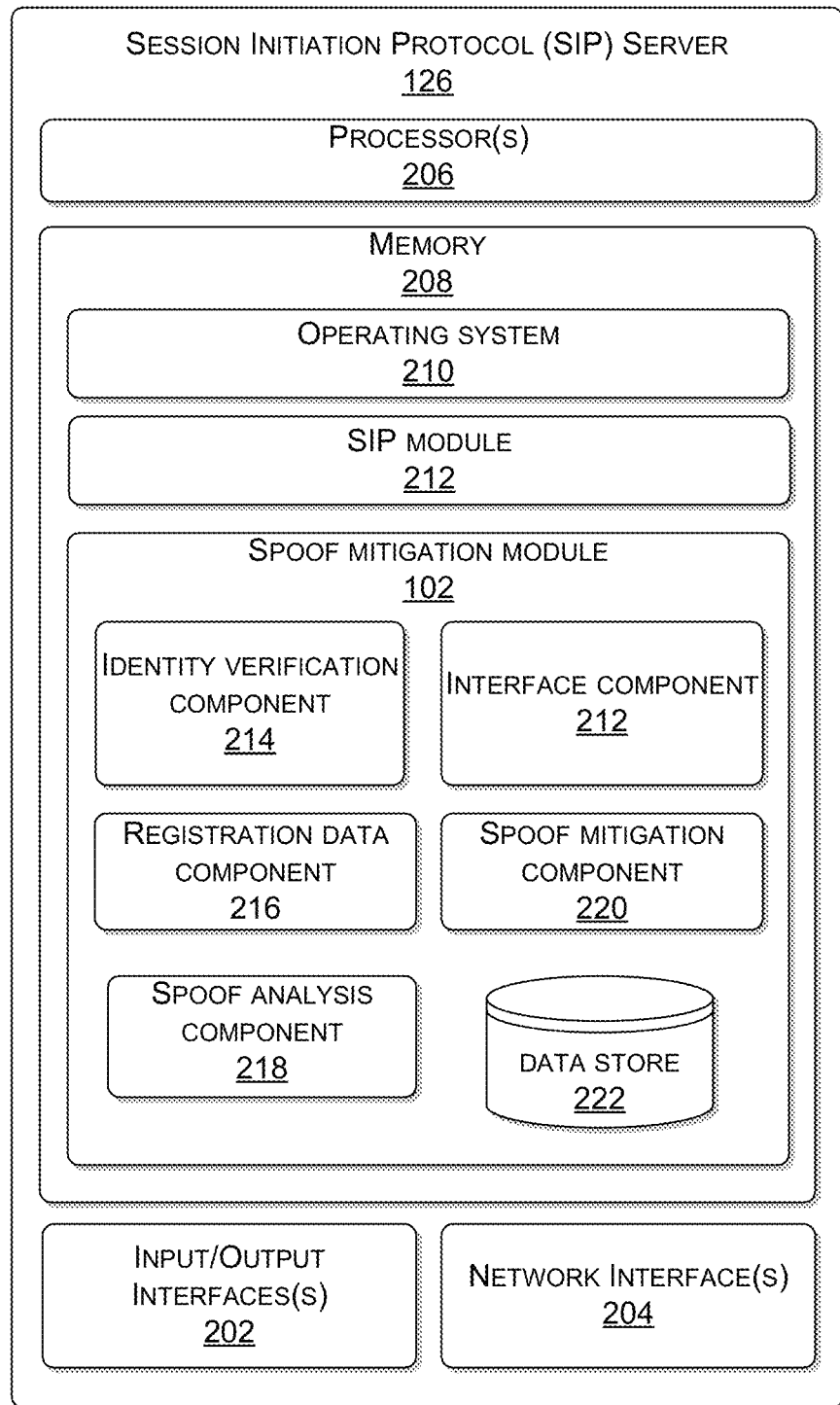
FIG. 2 illustrates a block diagram of various components of a SIP server that includes a spoof mitigation module.

FIG. 2 illustrates a block diagram of various components of a SIP server 126 that includes a spoof mitigation module 102. The spoof mitigation module 102 may be configured to determine whether an incoming VoIP communication request is a spoof communication. The SIP server 126 is configured to detect receipt of a SIP INVITE message and further determine whether the PLMN identified within the most recent instance of registration data of an originating device corresponds with the origin network from which the SIP INVITE message was sent. The origin network may be identified within the SIP INVITE message. A match would indicate that the identity of the originating device is likely reliable. In contrast, a mismatch may indicate that the identity of the originating device may be spoofed and is likely unreliable.

The SIP server 126 may include input/output interface(s) 202. The input/output interface(s) 202 may include any type of output interface known in the art, such as a display (e.g. a liquid crystal display), speakers, a vibrating mechanism, or a tactile feedback mechanism. Input/output interface(s) 202 also include ports for one or more peripheral devices, such as headphones, peripheral speakers, or a peripheral display. Further, the input/output interface(s) 202 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the SIP server 126 may include network interface(s) 204. The network interface(s) 204 may include any sort of transceiver known in the art. For example, the network interface(s) 204 may include a radio transceiver that performs the function of transmitting and receiving radio frequency communications via an antenna. In addition, the network interface(s) 204 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 204 may include wired communication components, such as an Ethernet port or a Universal Serial Bus (USB).

Further, the SIP server 126 may include one or more processor(s) 206 that are operably connected to memory 208. In at least one example, the one or more processor(s) 206 may be a central processing unit(s) (CPU), graphics processing unit(s) (GPU), or both a CPU and GPU or any other sort of processing unit(s). Each of the one or more processor(s) 206 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 206 may also be responsible for executing all computer applications stored in the memory, which can be associated with common types of volatile (RAM) and/or non-volatile (ROM) memory.

In some examples, memory 208 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 208 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 208 may include an operating system 210 and a spoof mitigation module 102. The spoof mitigation module 102 may further include an interface component 212, an identity verification component 214, a registration data component 216, a spoof analysis component 218, a spoof mitigation component 220, and a data store 222. The operating system 210 may be any operating system capable of managing computer hardware and software resources. The operating system 210 may include an interface layer that enables applications to interface with the input/output interface(s) 202 and the network interface(s) 204.

The interface component 212 is configured to receive a SIP INVITE message from an origin network. The origin network may correspond to a telecommunication network from which a call request is initiated. In this example, the telecommunication network may correspond to a SIP network, whereby a call request initiated via the transmission of a SIP INVITE message.

The identity verification component 214 may be configured to verify an identity of an origin network from which an originating device sent a call request (i.e. SIP INVITE message). In one example, the identity verification component 214 may identify an IP address within the SIP INVITE message that is used to identify the origin network from which the SIP INVITE message was sent. Alternatively, the identity verification component 214 may determine an identity of the origin network based on a P-Visited-Network-ID (PVNI) identifier or a PLMN ID associated with the origin network. The PVNI or PLMN ID may be included within the SIP INVITE message when sent by the originating device within the origin network. In some examples, if the PVNI or the PLMN ID is not available, then identifying the incoming network is used to determine the network origin.

Additionally, the identity verification component 214 may be configured to determine whether the originating device, as presented within the SIP INVITE message, is associated with a subscriber account of the HPLMN. To determine whether the call request is a spoof communication, a data comparison is performed between the SIP INVITE message and known subscriber account data. In other words, to infer that the call request initiated from the origin network is a spoof communication that imitates a subscriber device, the identity verification component 214 is to first determine whether the originating device as presented within the SIP INVITE message (i.e. spoofed or legitimate) is associated with a subscriber account of the HPLMN. In doing so, the spoof mitigation component 220 may compare the SIP INVITE message data with known subscriber account data that is associated with the legitimate, originating device.

The registration data component 216 is configured to interrogate an HSS, HLR, or USD of the HPLMN to identify the most recent instance of registration data that the originating device registered with the HPLMN. The HSS is configured to include data records of network registration associated with subscriber devices of the HPLMN. The network registrations may relate to registrations of the originating device within the HPLMN or registrations of the originating device within one or more VPLMN within which the subscriber device is roaming. Additionally, or alternatively, the registration data component 216 may interrogate a Universal Subscriber Database (USD) or a Home Location Register (HLR) associated with the HPLMN.

Each instance of a network registration includes at least a time-stamp of when the network registration occurred and a network identifier associated with the network within which the subscriber device registered. For example, if a subscriber device was most recently roaming in a VPLMN, the most recent instance of registration data recorded within the HSS, HLR, or USD of the HPLMN associated with the subscriber device would include registration data associated with the VPLMN.

The spoof analysis component 218 may be configured to analyze the SIP INVITE message and the most recent instance of registration data from the HSS to generate a spoof-likelihood score. In one example, the spoof analysis component 218 may determine whether the PLMN identified within the most recent instance of registration data of the originating device corresponds with the origin network. The origin network may be identified as the network from which the SIP INVITE message was sent or may be identified within the SIP INVITE message. A match would indicate that the originating device is located within the same PLMN (i.e. HPLMN or VPLMN) from which the SIP INVITE message was sent, thus indicating that the identity of the originating device is likely reliable. In contrast, if the most recent instance of registration data indicates that the originating device is within a first PLMN (i.e. HPLMN or VPLMN), and the origin network identified within the SIP INVITE message indicates that the originating device is within a second PLMN that is different from the first PLMN (i.e. VPLMN or HPLMN), the mismatch may indicate that the identity of the originating device may be spoofed, and is likely unreliable.

Additionally, the spoof analysis component 218 may be configured to generate a spoof-likelihood score. The spoof-likelihood score is configured to quantitatively determine a likelihood that a call request is being spoofed based on temporal indicators of the SIP INVITE message and a most recent instance of registration data.

In determining the spoof-likelihood score, the SIP server may use one or more trained machine learning algorithms to analyze various criteria, such as the time interval between the point-in-time that the most recent instance of registration data occurred and the current point-in-time associated with receipt of the SIP INVITE message, and the identity of the origin network associated with the SIP INVITE message relative to the identity of the PLMN identified within the most recent instance of registration data.

In one example, if the time interval between receiving the SIP INVITE message and the point-in-time associated with the most recent instance of registration data is greater than or equal to a predetermined time threshold, this may indicate that using the registration data to determine a location of the originating device may be unreliable. In contrast, if the spoof analysis component 218 determines that the time interval between receipt of the SIP INVITE message and the occurrence of the most recent instance of registration data is less than a predetermined time threshold, the SIP server may infer that the identity of the originating device is likely reliable. Thus, the SIP server may assign a low spoof-likelihood score, indicating the call request is unlikely a spoof communication.

The spoof-likelihood score may be alpha-numeric (i.e. 0 to 10, or A to F), descriptive (i.e. low, medium, or high), based on color, (i.e. red, yellow, or green), or any other suitable rating scale. A high spoof-likelihood score (i.e. 7 to 10, high, or red) may indicate that a call request is likely a spoofed communication. In contrast, a low similarity score (i.e. 0 to 3, low, green) may indicate that a call request is unlikely a spoofed communication.

The spoof mitigation component 220 may be configured to initiate or terminate a VoIP communication based at least in part on the spoof-likelihood score. In one example, the spoof mitigation component 220 may determine that a call request (i.e. SIP INVITE message) is likely to be a spoof communication (i.e. medium-to-high spoof-likelihood score), and in doing so, may selectively generate computer-executable instructions that tag the SIP INVITE message with a likely-spoof tag. The computer-executable instructions may be further configured to establish the VoIP communication session between the originating device and the recipient device and present the likely-spoof tag on a display of the recipient device at the same point-in-time as establishing the VoIP communication session.

In another example, the spoof mitigation component 220 may selectively terminate the call request for the VoIP communication based on an inference that the call request is associated with a spoof communication (i.e. high spoof-likelihood score). The SIP server may ignore the SIP INVITE message, whereby the failure to respond to the SIP INVITE message acts to prevent the VoIP communication session from being established. Alternatively, the spoof mitigation component 220 may reply to the SIP INVITE message with a "not accepted" response, which similarly prevents the VoIP communication session from being established.

Moreover, the spoof mitigation component 220 may also be configured to infer that the identity of the originating device is likely reliable (i.e. low spoof-likelihood score), and in doing so, transmit the SIP INVITE message to the recipient device to facilitate establishing the VoIP communication session between the originating device and the recipient device.

The data store 222 may be configured to store data records associated with the spoof-likelihood scores, registration data from the HSS, HLR, or USD and any other pertinent data used to generate a spoof-likelihood score, infer a spoof communication, and execute a spoof mitigation process.

Figure 3:
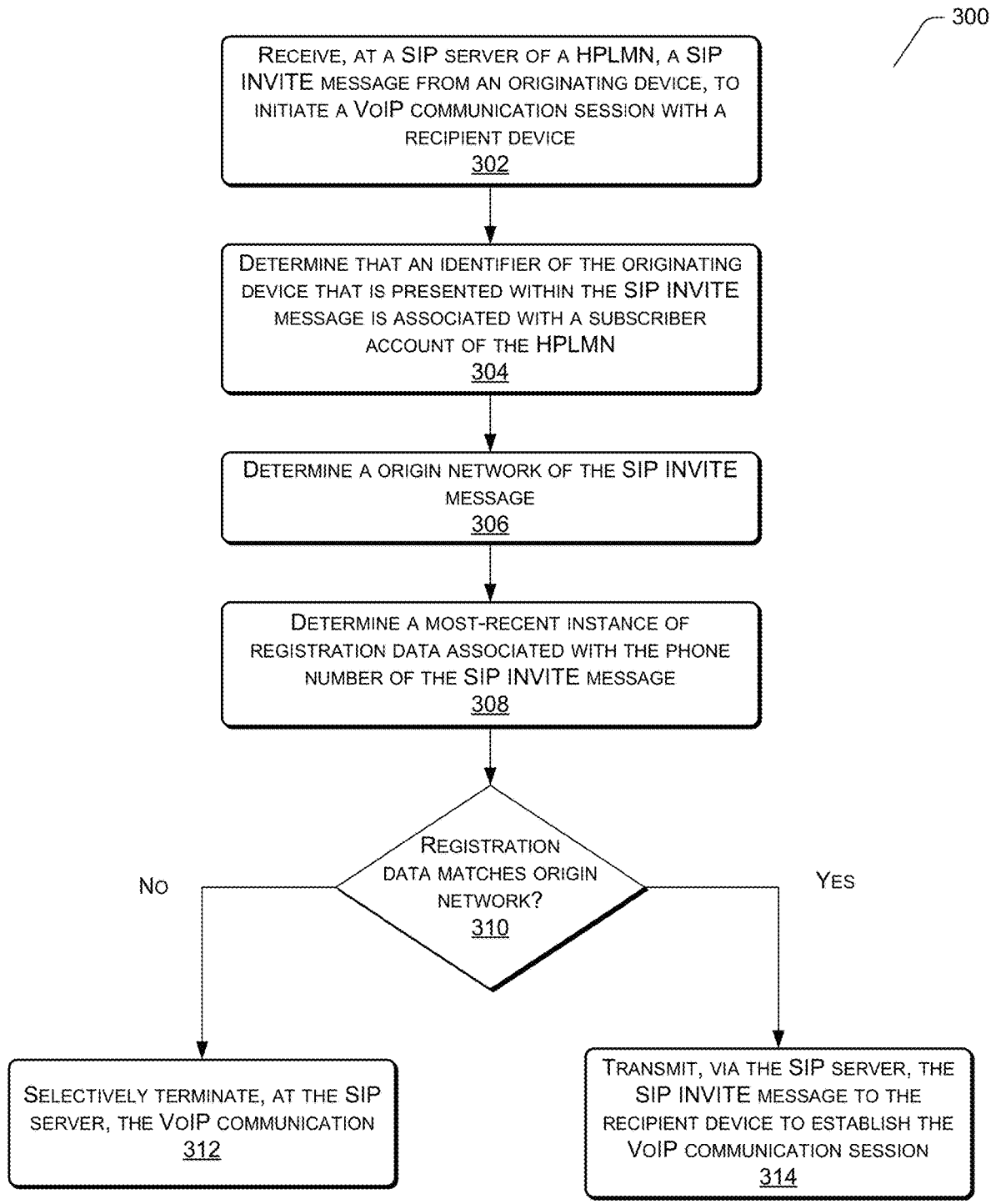
FIG. 3 illustrates a process for determining whether an incoming VoIP communication request is a spoof communication.
Figure 4:
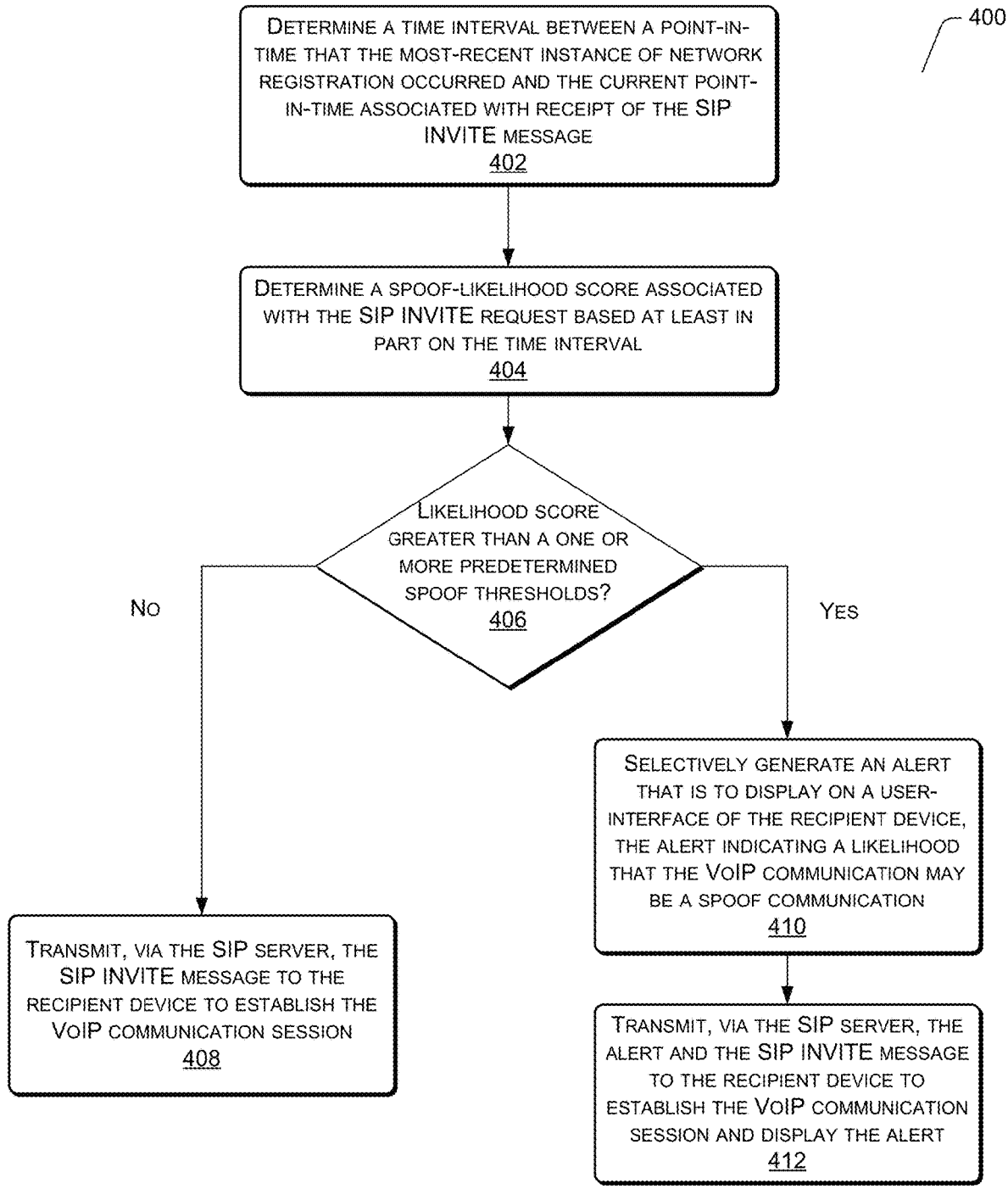
FIG. 4 illustrates a process of inferring a likelihood that a call request is being spoofed based on temporal indicators of the SIP INVITE message and a most recent instance of registration data.

FIGS. 3 and 4 present processes 300 and 400 that relate to operations of a spoof mitigation module 102 of a SIP server 126. Each of processes 300 and 400 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 400 are described with reference to the computing environment 100 of FIG. 1.

FIG. 3 illustrates a process for determining whether an incoming VoIP communication request is a spoof communication. A determination and mitigation of a spoof communication may be performed by a spoof mitigation module of a SIP server associated with an HPLMN. In this example, the spoof mitigation module is included within the SIP server. However, variations and modifications can be made such that the spoof mitigation module may be remotely executable on a separate server or a separate computing device that is communicatively coupled to the SIP server.

At 302, the SIP server of an HPLMN may receive a SIP INVITE message from an originating device to initiate a VoIP communication session with a recipient device. The SIP INVITE message may correspond to a call request configured to initiate a dialog for establishing a voice communication, such as a VoIP communication session, between at least a pair of client devices, such as the originating device and the recipient device.

At 304, the SIP server may determine that an identifier of the originating device that is presented within the SIP INVITE message is associated with a subscriber account of the HPLMN. The identifier may correspond to a phone number, an International Mobile Subscriber Identity (IMSI), a Mobile Station International Subscriber Directory Number (MSISDN), or an International Mobile Equipment Identity (IMEI).

At 306, the SIP server may determine an origin network of the SIP INVITE message. In this instance, the SIP server may analyze the SIP INVITE message to identify an IP address associated with the telecommunication network that sent the SIP INVITE message. Alternatively, the SIP INVITE message may include a P-Visited-Network-ID (PVNI) or a PLMN ID associated with the origin network.

In one example, the origin network may correspond to the HPLMN. In other words, the SIP INVITE message that is being analyzed as a spoof communication of an actual subscriber device may have originated within the HPLMN of the subscriber device. Alternatively, the SIP INVITE message may have originating from within a PLMN that is different from the HPLMN (i.e. VPLMN).

At 308, the SIP server may determine a most recent instance of registration data of the originating device within the HPLMN. In this example, since the originating device has been determined as being associated with a subscriber account (i.e. step 304), the SIP server may interrogate an HSS, HLR, or USD of the HPLMN to identify the most recent instance of registration data that the originating device registered with the HPLMN.

The HSS is configured to include data records of network registration associated with subscriber devices of the HPLMN. The network registrations may relate to registrations of the originating device within the HPLMN or registrations of the originating device within one or more VPLMN within which the subscriber device is roaming.

Each instance of a network registration includes at least a time-stamp of when the network registration occurred and a network identifier associated with the network within which the subscriber device registered. For example, if a subscriber device was most recently roaming in a VPLMN, the most recent instance of registration data recorded within the HSS of the HPLMN associated with the subscriber device would include registration data associated with the VPLMN.

At 310, the SIP server may determine whether the PLMN identified within the most recent instance of registration data of the originating device corresponds with the origin network that was identified within the SIP INVITE message. A match would indicate that the originating device is located within the same PLMN (i.e. HPLMN or VPLMN) from which the SIP INVITE message was sent, thus indicating that the identity of the originating device is likely reliable. In contrast, if the most recent instance of registration data indicates that the originating device is within a first PLMN (i.e. HPLMN or VPLMN), and the origin network identified within the SIP INVITE message indicates that the originating device is within a second PLMN that is different from the first PLMN (i.e. VPLMN or HPLMN), the mismatch may indicate that the identity of the originating device may be spoofed, and is likely unreliable.

At 312, the SIP server may determine that the PLMN identified within the most recent instance of registration data within the HPLMN (i.e. data records within the HSS of the HPLMN) does not match the origin network identified within the SIP INVITE message. In this instance, the SIP server may infer that the identity of the originating device is spoofed and is likely unreliable. In doing so, the SIP server may selectively terminate the request for the VoIP communication. In one example, the SIP server may ignore the SIP INVITE message, whereby the failure to respond acts to prevent the VoIP communication session from being established. In another example, the SIP server may reply to the SIP INVITE message with a "not accepted" response, which similarly prevents the VoIP communication session from being established.

In yet another example, the SIP server may facilitate establishing the VoIP communication session along with presenting a "likely spoof" tag that indicates to a user of the recipient device that the VoIP communication may be spoofed. For example, the SIP server may transmit the SIP INVITE message to the recipient device to facilitate establishing the VoIP communication between the originating device and the recipient device. Concurrently, the SIP server may generate and deliver to the recipient device, computer-executable instructions that present the likely-spoof tag on a display of the recipient device at the same point-in-time as establishing the VoIP communication session.

At 314, the SIP server may determine that the PLMN identified within the most recent instance of registration data within the HPLMN matches the origin network, the origin network having been identified as the network from which the SIP INVITE was sent, or the network identified within the SIP INVITE message. In this instance, the SIP server may infer that the identity of the originating device is likely reliable. In doing so, the SIP server may transmit the SIP INVITE message to the recipient device to facilitate establishing the VoIP communication session between the originating device and the recipient device.

FIG. 4 illustrates a process of inferring a likelihood that a call request is being spoofed based on temporal indicators of the SIP INVITE message and a most recent instance of registration data. In this process, the SIP server may compare the point-in-time that the most recent instance of network registration occurred with a current point-in-time associated with receipt of the SIP INVITE message (i.e. call request). In one example, if the time interval between receiving the SIP INVITE message and the point-in-time associated with the most recent instance of registration data is greater than or equal to a predetermined time threshold, this may indicate that using the registration data to determine a location of the originating device may be unreliable. For example, consider an originating device that is roaming within a VPLMN, and before departing the VPLMN, the originating device is switched off. This scenario is typical of air travel. In this example, the most recent registration data may indicate that the originating device is still within the VPLMN. However, the time-lapse between a current point-in-time and the most recent instance of registration data may indicate that the originating device may have departed the VPLMN, or that the originating device is simply switched off. If the originating device has not re-registered with the VPLMN, or the HPLMN, for a time interval that is greater than or equal to a predetermined time threshold, this may indicate that a call request is unlikely to have been initiated by the originating device, and thus is likely spoofed. In various examples, the predetermined time threshold may be set by an administrator of the HPLMN. The predetermined time threshold may correspond to one hour, three hours, or six hours. Any time threshold is possible.

At 402, the SIP server may determine a time interval between a point-in-time that the most recent instance of registration data occurred at an HPLMN of the originating device and the current point-in-time associated with receipt of the SIP INVITE message (i.e. call request).

In this example, the SIP INVITE message may include a timestamp that defines the current point-in-time. Similarly, each instance of registration data recorded within the HSS of the HPLMN may include a time-stamp of when the device registration occurred.

At 404, the SIP server may determine a spoof-likelihood score associated with the SIP INVITE message, based at least in part on the time interval. The spoof-likelihood score may be alpha-numeric (i.e. 0 to 10, or A to F), descriptive (i.e. low, medium, or high), based on color, (i.e. red, yellow, or green), or any other suitable rating scale. A high spoof-likelihood score (i.e. 7 to 10, high, or red) may indicate that a call request is likely a spoofed communication. In contrast, a low similarity score (i.e. 0 to 3, low, green) may indicate that a call request is unlikely a spoofed communication.

In determining the spoof-likelihood score, the SIP server may use one or more trained machine learning algorithms to analyze various criteria, such as the time interval between the point-in-time that the most recent instance of registration data occurred and the current point-in-time associated with receipt of the SIP INVITE message, and the identity of the origin network associated with the SIP INVITE message relative to the identity of the PLMN identified within the most recent instance of registration data.

For example, the SIP server may determine that the PLMN of the origin network matches the PLMN identified within the most recent instance of registration data within the HSS of the HPLMN. The PLMN of the origin network may be based on the network from which the SIP INVITE message was received. Alternatively, the PLMN of the origin network may be identified from within the SIP INVITE message. If the SIP server further determines that the time interval between receipt of the SIP INVITE message and the occurrence of the most recent instance of registration data is less than a predetermined time threshold, the SIP server may infer that the identity of the originating device is likely reliable. Thus, the SIP server may assign a low spoof-likelihood score, indicating the call request is unlikely a spoof communication.

Alternatively, the SIP server may determine that the PLMN identified within the SIP INVITE message does not match the PLMN identified within the most recent instance of registration data within the HSS of the HPLMN. If the SIP server further determines that the time interval between receipt of the SIP INVITE message and the occurrence of the most recent instance of registration data is less than a predetermined time threshold, the SIP server may infer that the identity of the originating device is likely spoofed, and thus likely unreliable. Thus, the SIP server may assign a high spoof-likelihood score, as an indication that the call request is likely a spoofed communication.

In another alternate embodiment, the SIP server may determine that the time interval between receipt of the SIP INVITE message and the occurrence of the most recent instance of registration data is greater than a predetermined time threshold. In this instance, a match between the PLMN identified within the SIP INVITE message and the PLMN identified within the most recent instance of registration data, when coupled with an extended time interval, may indicate a spoofed communication. For example, in order for the originating device to initiate a communication, it is required to submit registration data that is recorded within the HSS of the HPLMN. If the registration data has not been recorded within the HSS for a time interval that corresponds to receipt of the SIP INVITE message (i.e. call request), then the SIP server may infer that the call request is a spoofed communication, irrespective of whether the PLMN identified within the SIP INVITE message matches the PLMN identified within the most recent instance of registration data. Thus, the SIP server may assign a high spoof-likelihood score, indicating the call request is likely a spoofed communication.

At 406, the SIP server may determine whether the spoof-likelihood score is greater than or equal to one or more predetermined spoof thresholds. The one or more predetermined spoof thresholds may be set by an administrator of the HPLMN. In one example, a first predetermined spoof threshold may be used to delineate low-to-medium spoof-likelihood scores, and a second predetermined spoof threshold may delineate medium-to-high spoof-likelihood scores. In some examples, the SIP server may use the first predetermined spoof threshold, the second predetermined spoof threshold, or a combination of both, to determine the type of actions to take in response to a likely or unlikely spoof communication.

At 408, the SIP server may determine that the spoof-likelihood score is less than the one or more predetermined spoof thresholds. Continuing with the above example from step 406, the SIP server may determine that the spoof-likelihood score is less than the first predetermined spoof threshold and the second predetermined spoof threshold. In this instance, the spoof-likelihood score is a low spoof-likelihood score, the SIP server may infer that the identity of the originating device is likely reliable. In doing so, the SIP server may transmit the SIP INVITE message to the recipient device to facilitate establishing the VoIP communication session between the originating device and the recipient device.

At 410, the SIP server may determine that the spoof-likelihood score is greater than at least one predetermined spoof threshold, namely the first predetermined spoof threshold described earlier with reference to step 406. In this example, the SIP server may selectively generate a likely-spoof tag that is to display on a user-interface of the recipient device. The alert may indicate a likelihood that the VoIP communication is a spoof communication.

At 412, the SIP server may generate computer-executable instructions that tag the SIP INVITE message with a likely-spoof tag. The computer-executable instructions may be further configured to establish the VoIP communication session between the originating device and the recipient device and present the likely-spoof tag on a display of the recipient device at the same point-in-time as establishing the VoIP communication session.

In an alternative embodiment, the SIP server may determine that the spoof-likelihood score is greater than the first and second predetermined spoof thresholds, as described with reference to step 406. In this instance, the SIP server may infer, with a high degree of confidence, that the call request is likely a spoof communication. Thus, the SIP server may selectively terminate the request for the VoIP communication. In one example, the SIP server may ignore the SIP INVITE message, whereby the failure to respond to the SIP INVITE message acts to prevent the VoIP communication session from being established. In another example, the SIP server may reply to the SIP INVITE message with a "not accepted" response, which similarly prevents the VoIP communication session from being established.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A Session Internet Protocol (SIP) server, comprising:
one or more processors;
memory coupled to the one or more processors, the memory including one or more modules that are executable by the one or more processors to:
receive a call request to initiate a Voice over Internet Protocol (VoIP) communication session between an originating device and a recipient device;
determine an identity of an originating network associated with the call request;
identify a subscriber account associated with the originating device;
analyze registration data associated with the subscriber account; and
infer whether the call request is a spoof communication based at least in part on analysis of the registration data and the identity of the originating network.

2. The SIP server of claim 1, wherein to analyze the registration data further comprises:

determining a time interval between a most-recent instance of network registration of the originating device and a current point in time; and inferring that the call request is the spoof communication based on the time interval being greater than a predetermined threshold.

3. The SIP server of claim 1, wherein to
infer that the call request is the spoof communication based at least in part on the identity of the originating network mismatching the registration data.

4. The SIP server of claim 1, wherein the one or more modules are further executable by the one or more processors to:
infer that the call request is the spoof communication, based at least in part on analysis of the registration data; and
reject the call request.

5. The SIP server of claim 1, wherein the one or more modules are further executable by the one or more processors to:
determine an initiating phone number of the originating device, based at least in part on the call request, and
wherein to identify the subscriber account is based at least in part on the initiating phone number.

6. The SIP server of claim 1, wherein an origin network associated with the call request is one of a Home Public Land Mobile Network (HPLMN) or a Visited Public Land Mobile Network (VPLMN).

7. The SIP server of claim 1, wherein the one or more modules are further executable by the one or more processors to:
generate a spoof-likelihood score; and
transmit, to the recipient device, computer-executable instructions that present a likely-spoof tag on a display of the recipient device, based at least in part on the spoof-likelihood score; and
establish the VoIP communication session.

8. The SIP server of claim 1, wherein the one or more modules are further executable by the one or more processors to:
retrieve, from the call request, one of a P-Visited-Network ID (PVNI) or an Internet Protocol (IP) address associated with the originating device; and
identify a Home PLMN associated with the originating device, based at least in part on one of the PVNI or the IP address.

9. A computer-implement method for inferring a spoof communication via a Session Internet Protocol (SIP) server, comprising:
under control of one or more processors;
receiving, at a first Public Land Mobile Network (PLMN) and from an originating device, a call request to initiate a Voice over Internet Protocol (VoIP) communication session with a recipient device; and
determining an identity of a second PLMN associated with the originating device;
analyzing registration data from the second PLMN that is associated with the originating device; and
inferring whether the call request is the spoof communication, based at least in part on analysis of the registration data and the identity of the originating network.

10. The computer-implemented method of claim 9, further comprising:
retrieving, from the second PLMN, the registration data from at least one of a Home Subscriber Server (HSS), a Home Location Register (HLR), or a Universal Subscriber Database.

11. The computer-implemented method of claim 9, further comprising:
determining that the call request is the spoof communication; and
rejecting the VoIP communication.

12. The computer-implemented method of claim 9, further comprising:
generating a spoof-likelihood score based at least in part on analysis of the registration data; and
selectively, establishing the VoIP communication between the originating device and the recipient device based at least in part on the spoof-likelihood score.

13. The computer-implemented method of claim 12, further comprising:
transmitting, to the recipient device, computing-executable instructions that present a likely-spoof tag on a display of the recipient device, based at least in part on the spoof-likelihood score.

14. The computer-implemented method of claim 9, wherein the first PLMN is one of a Home PLMN of the originating device or a Visited PLMN of the originating device.

15. The computer-implemented method of claim 9, wherein the first PLMN and the second PLMN are a same PLMN.

16. The computer-implemented method of claim 9, further comprising:
determining a time interval between a point-in-time that a most-recent instance of network registration occurred and a current point-in-time associated with receipt of the call request, and
wherein, inferring whether the call request is the spoof communication is further based at least in part on the time interval.

17. One or more non-transitory computer-readable media storing computer-executable instructions that, when executed on one or more processors, cause the one or more processors to perform acts comprising:
receiving a Session Internet Protocol (SIP) INVITE message to establish a Voice over Internet Protocol (VoIP) communication session between an originating device and a recipient device;
determining an identity of a first Public Land Mobile Network (PLMN) associated with an origin of the SIP Invite message, based at least in part on the SIP INVITE message;
identifying a second PLMN associated with the originating device;
analyzing registration data from the second PLMN that is associated with the originating device; and
inferring whether the SIP INVITE message is a spoof communication based at least in part on analysis of the registration data and the identity of the first PLMN.

18. The one or more non-transitory computer-readable media of claim 17, wherein the second PLMN is an HPLMN of the originating device, and
wherein, first PLMN is different from the second PLMN.

19. The one or more non-transitory computer-readable media of claim 17, further comprising:
generating a spoof-likelihood score based at least in part on analysis of the registration data; and
selectively, establishing the VoIP communication between the originating device and the recipient device based at least in part on the spoof-likelihood score.

20. The one or more non-transitory computer-readable media of claim 17, further comprising:

determining a time interval between a most-recent instance of network registration of the originating device and a current point in time; and inferring that the SIP INVITE message is the spoof communication based on the time interval being greater than a predetermined threshold.

* * * * *